United States Patent
Ravarini

(10) Patent No.: US 10,907,753 B2
(45) Date of Patent: Feb. 2, 2021

(54) HEATED HOSE, IN PARTICULAR FOR OILING PLANTS, IN PARTICULAR FOR ELECTROSTATIC OILING OF METAL BANDS

(71) Applicant: RAVARINI CASTOLDI & C.S.R.L., Milan (IT)

(72) Inventor: Luigi Ravarini, Milan (IT)

(73) Assignee: RAVARINI CASTOLDI & C.S.R.L., Milan (IT)

( * ) Notice: Subject to any disclaimer, the term of this patent is extended or adjusted under 35 U.S.C. 154(b) by 0 days.

(21) Appl. No.: 15/576,103

(22) PCT Filed: Jun. 17, 2016

(86) PCT No.: PCT/IB2016/053602
§ 371 (c)(1),
(2) Date: Nov. 21, 2017

(87) PCT Pub. No.: WO2016/207766
PCT Pub. Date: Dec. 29, 2016

(65) Prior Publication Data
US 2018/0135781 A1    May 17, 2018

(30) Foreign Application Priority Data
Jun. 22, 2015 (IT) .................. 102015000026183

(51) Int. Cl.
*F16L 11/08* (2006.01)
*F16L 11/115* (2006.01)
(Continued)

(52) U.S. Cl.
CPC .......... *F16L 11/086* (2013.01); *F16L 11/085* (2013.01); *F16L 11/115* (2013.01); *F16L 11/125* (2013.01);
(Continued)

(58) Field of Classification Search
CPC ...... F16L 11/086; F16L 11/085; F16L 11/115; F16L 11/125; F16L 11/20; F16L 53/32; F16N 39/04; B21D 37/18
(Continued)

(56) References Cited

U.S. PATENT DOCUMENTS 3,643,733 A * 2/1972 Hall .................. F28D 7/026
138/32
3,832,525 A * 8/1974 Stanton .................. B60P 3/36
392/468
(Continued)

FOREIGN PATENT DOCUMENTS

| FR | 2822922 | 10/2002 |
| WO | 93/17266 | 9/1993 |
| WO | 2004089553 | 10/2004 |

OTHER PUBLICATIONS

International Search Report and Written Opinion, European patent Office, Application No. PCT/IB2016/053602, dated Sep. 26, 2016.

*Primary Examiner* — Craig M Schneider
*Assistant Examiner* — David R Deal
(74) *Attorney, Agent, or Firm* — Gottlieb, Rackman & Reisman, PC

(57) ABSTRACT

A coaxial hose for electrostatic oiling systems that includes a flexible external tube, and a flexible internal tube for the circulation of a second fluid inside thereof. The internal tube together with the external tube form an annular space for the circulation of a first fluid. The internal tube includes an internal layer made of PTFE that is intended to contain the second fluid, internal braiding that is intended to lend the internal tube pressure resistance and an external layer that is made of polyamide material which is intended to prevent the passage of the first fluid through the braiding.

12 Claims, 1 Drawing Sheet

(51) Int. Cl.
*F16L 11/20* (2006.01)
*F16L 53/32* (2018.01)
*F16L 11/12* (2006.01)
*F16N 39/04* (2006.01)
*B21D 37/18* (2006.01)

(52) U.S. Cl.
CPC ............... *F16L 11/20* (2013.01); *F16L 53/32* (2018.01); *F16N 39/04* (2013.01); *B21D 37/18* (2013.01)

(58) Field of Classification Search
USPC .................................................... 138/32, 114
See application file for complete search history.

(56) References Cited

U.S. PATENT DOCUMENTS

| | | | | |
|---|---|---|---|---|
| 4,620,645 | A * | 11/1986 | Hale | E01C 19/45 126/343.5 A |
| 4,817,672 | A * | 4/1989 | Broodman | C10G 9/20 122/DIG. 13 |
| 5,097,898 | A * | 3/1992 | Verkaart | A61M 5/44 165/142 |
| 5,573,039 | A * | 11/1996 | Mang | F16L 11/12 138/137 |
| 6,279,614 | B1 * | 8/2001 | Riesselmann | B32B 1/08 138/137 |
| 6,328,074 | B1 * | 12/2001 | Wright | F16L 9/18 138/114 |
| 6,607,010 | B1 * | 8/2003 | Kashy | D04C 1/02 138/121 |
| 7,000,644 | B2 * | 2/2006 | Ichimura | B60H 1/00571 138/109 |
| 8,272,407 | B2 * | 9/2012 | Soyland | B05B 5/1608 138/109 |
| 2004/0134553 | A1 * | 7/2004 | Ichimura | B60H 1/00571 138/114 |
| 2011/0111993 | A1 * | 5/2011 | Shimura | C10M 169/00 508/130 |
| 2013/0048135 | A1 * | 2/2013 | Blumenthal | F16L 59/147 138/114 |

* cited by examiner

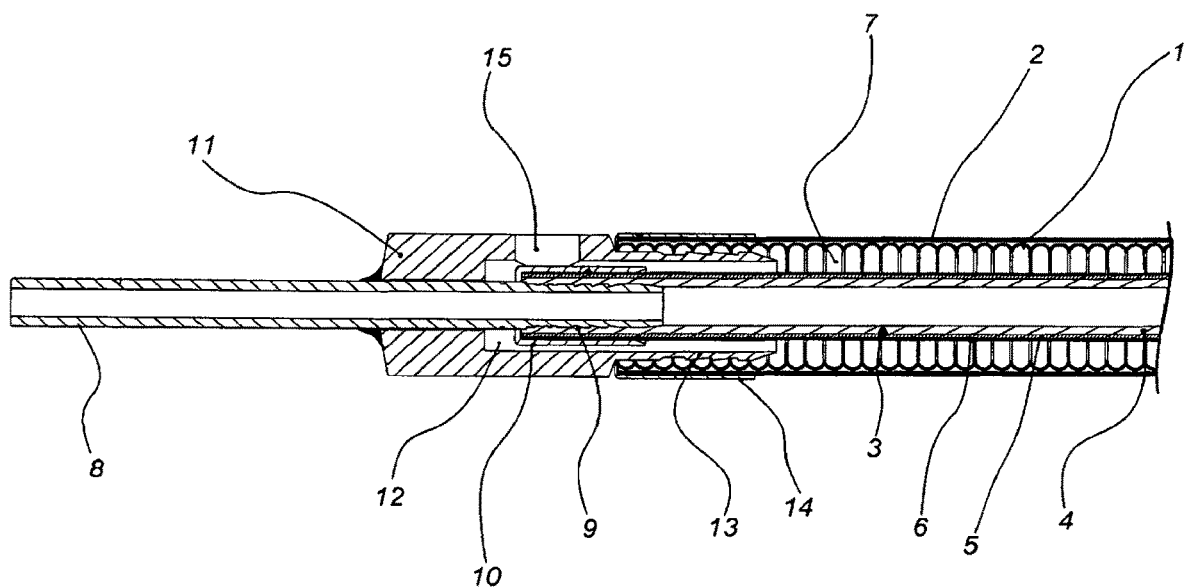

HEATED HOSE, IN PARTICULAR FOR OILING PLANTS, IN PARTICULAR FOR ELECTROSTATIC OILING OF METAL BANDS

CROSS-REFERENCE TO RELATED APPLICATION

This patent application claims benefit under 35 U.S.C. § 371 to International Patent Application No. WO 2016/207766, filed Jun. 17, 2016, which claims priority to Italian Patent Application IT 102015000026183, filed Jun. 22, 2015, the contents of which are hereby incorporated by reference in their entirety as part of the present disclosure.

FIELD OF THE INVENTION

The present invention relates to a heated coaxial tube, particularly suitable for oiling systems, in particular for electrostatic oiling of metal items with solid lubricants, more in particular, making use of protective oils or lubricants with a dropping point higher than the room temperature.

BACKGROUND OF THE INVENTION

It is common practice to lubricate the metal sheets intended for use in particular types of processing, such as forming. The oiling is usually performed on the metal strips from which the sheets are obtained. Electrostatic oiling is particularly preferred because of the uniformity of application and the high yield thereof. The use of lubricants which are solid at room temperature, with dropping points ranging, for example, from 30° C. to 50° C., has proved particularly advantageous.

Patent Publication No. WO 2004/089553 describes a system for electrostatic oiling in which particular techniques are employed for the oiling with lubricants of this type, the dropping point of which creates problems, compared to oils which are liquid at room temperature, due to the need to keep the lubricant liquid throughout the entire system so as to circulate said lubricant. In particular, all the tubes and pumps where the lubricant circulates, are fed by a heated mixer, where said lubricant is maintained in the liquid state, are heated by circulation of a heat transfer (diathermic) fluid, kept at a suitable temperature (for example 90° C.-110° C.), which circulates in the annular space of the coaxial tubes or in the circulation chambers in the body of the pumps and filters. The circuit includes the following elements placed in series: a heated pump for the lubricant and a heated double filter.

The circulation of the heat transfer fluid occurs by means of special pumps and is maintained at an appropriately controlled temperature. According to a possible embodiment, the fluid is maintained at the appropriate temperature within a circuit equipped with a special heater, and is drawn from the circuit at several points by means of pumps which feed it to various parts of the system (for example the annular spaces of heaters or mixers or to the cabin where deposition occurs) within special tubes or annular spaces in order to maintain the appropriate temperature in the atomising blades, in the bottom where the excess lubricant is collected to be re-circulated, and in other areas. In particular, some delivery points are used to feed the fluid within the annular spaces of coaxial tubes, wherein the lubricant circulates within the internal tube. The fluid must be brought to a suitable pressure to allow an adequate flow rate in the annular space. Generally, it is fed in at one end of the annular space and flows out of the opposite end from where it is drawn in order to be conveyed back to the heater circuit. It is also possible, if deemed appropriate, to connect several the annular spaces of several coaxial tubes in a series or one annular space with other heating elements for other system components. It is also possible to envisaged several heaters or heating circuits for the fluid to be fed to different parts of the system, or other types of solution, depending on the knowledge of the person skilled in the art and the requirements.

The coaxial tubes commonly used in the known systems are, in general, flexible tubes, with an external rubber tube which is resistant to heat and the pressure levels needed to maintain the circulation of the diathermic fluid. The internal tube, given the smaller diameter thereof, can be advantageously made of PTFE, which is resistant to heat and endowed with high chemical resistance. The flexibility with which such tubes are endowed is very advantageous when setting up the system and allows quick replacement and maintenance operations and the possibility of quickly varying the system configuration where necessary.

However, the solution adopted is not completely satisfactory, in particular due to certain peculiarities in the intended process.

One event which can occur frequently is the collapse and subsequent rapture of the internal tube made of PTFE, which is more fragile than rubber tubing and which can occur, in particular, when the tube is empty or not sufficiently pressurized. In particular, the pressure of the heat transfer fluid within the annular space reaches maximum operating levels in situations such as cold starts when the viscosity of the heat transfer fluid (and consequently the pressure thereof) are higher to ensure adequate flow rate. This leads to difficult adjustments which are not useful in terms of system operation. The fact that the lubricant is solid at a cold start makes it difficult to bring the internal tube to sufficient pressure levels quickly and collapses may still occur despite the precautions taken. The collapse of the internal tube, in addition to the rupture, leads to drawbacks which impair normal operating conditions.

WO 2004/089553 also suggests the use of a flexible internal tube, with or without reinforcement braiding, which provides good flexibility with resistance to internal pressure. However, the choice of materials was made solely to ensure the separation of the two fluids, while the problem of collapse of the internal tube has been ignored. The external layer, usually made of heat-resistant synthetic rubber and designed to protect the reinforcement braiding against the fluid, did not allow any external load to be distributed in order to prevent the tube collapsing.

A further drawback concerns the external tube, which, despite the quality of the rubber, is prone to increased fragility due to the temperatures to which it is subjected, which means ruptures and leaks, especially if the tube is curved, taking advantage of the flexibility. All this has constituted a limitation to the use of flexible tubes, with the result that use of conventional rigid coaxial tubes is preferred, with considerable repercussions on the cost and the difficulty of constructing the system.

SUMMARY OF THE INVENTION

The problem set out above have now been overcome through a coaxial tube, in particular for electrostatic oiling systems that comprises: a flexible external tube; a flexible internal tube for the circulation of a second fluid inside thereof, forming, together with the external tube, an annular space for the circulation of a first fluid, wherein the internal tube comprises: an internal layer made of PTFE intended to contain the second fluid; internal braiding intended to lend the internal tube pressure resistance; and an external layer made of polyamide material intended to prevent the passage of the first fluid through the braiding.

The invention also relates to an electrostatic oiling process wherein the internal and external tubes of a hose as defined above allow circulation of a heat transfer fluid at a suitable temperature (for example between 90° C. and 120° C.) and a lubricant, in particular a lubricant with a dropping point above 30° C. (for example between 30° C. and 50° C.) According to a preferred aspect, the heat transfer fluid constitutes the first fluid and circulates in the annular space, while the lubricant constitutes the second fluid and circulates in the internal tube. The invention also relates to a system for electrostatic oiling equipped with one or more hoses as defined above.

According to a further aspect, the braiding is made of mesh or knitting, of an appropriate material, for example knitted metal wires, in particular, stainless steel.

According to a further aspect, the external layer is a flexible polyamide material which can resist temperatures of up to at least 120° C. A preferred material is polyamide 12. According to a still further aspect, the external tube has the form of corrugated tube, which allows the use of more heat-resistant materials than rubbers, without significantly reducing the flexibility of the tube, despite the diameter thereof. Preferably, the external tube is made of PTFE. According to a further aspect, the external tube features external braiding to lend pressure resistance, and such external braiding may be made of mesh or knitting, of an appropriate material, for example knitted metal wires, in particular, stainless steel.

BRIEF DESCRIPTION OF THE DRAWING

The invention will now be better illustrated by means of the description of a preferred embodiment, provided in the form of a non-limiting example, with the help of an accompanying FIGURE in which:

The FIGURE is a longitudinal cross-sectional view of a portion of the hose according to the present invention, at one end thereof.

DETAILED DESCRIPTION OF EMBODIMENTS OF THE INVENTION

With reference to the FIGURE, an external tube 1 is shown, which can be made of PTFE (which features excellent chemical resistance and withstands temperatures up to 250° C., well beyond the usual temperature of heat transfer fluid in a system of the kind mentioned above) with corrugated structure. A second braiding 2 serves to lend pressure resistance to the external tube and is made, for example, of knitted stainless steel wires. The knitting can be easily made, according to requirements, in a known manner, using the knowledge of a person skilled in the art.

An internal tube 3 comprises a first layer 4 made of PTFE tube, which is resistant to heat and corrosion, brought about, in particular, by a lubricant as defined above. Tubes made of this material have already been used as an internal tube for coaxial hoses according to the prior art, in oiling systems with lubricants of the type stated above, although with non-optimum thicknesses. The optimum thickness of this layer can be easily identified by a person skilled in the art, in order to reach an optimal compromise in terms of flexibility and strength, in light of the changes made to the structure of the internal tube. According to the present invention, a first braiding 5 is included, which is intended to lend pressure resistance and is also made, for example, of knitted stainless steel wires.

There is a second layer 6, intended to prevent the passage of the first fluid present in the annular space 7 formed between the external tube 1 and the internal tube 3, and to distribute the load due to the pressure of the first fluid on the first braiding 5. Given the chemical resistance and the temperature of the first layer 4, and the fact that the pressure is now withstood by the braiding (whether such pressure is greater within the internal tube or within the annular space), it suffices to use a material which is resistant to the temperature of the heat transfer fluid, without affecting the flexibility of the internal tube 3.

Thus, the external layer may be made of a more flexible material than the internal layer. A polyamide material, which is preferred for the second layer, is polyamide 12. The thickness can be contained, for example, between 0.5 mm and 1.5 mm, being, for example, 1 mm.

The external pressure resistance of the internal tube 3 (lent by the presence of the second layer 6) may also be taken account of when designing the internal layer, which, as said, will preferably be made of PTFE. Since there is no longer any risk of collapse of the tube, it will be possible to achieve adequate resistance for this layer with lower thicknesses than that of the internal tube of hoses according to the prior art, providing advantages in terms of flexibility and heat exchange, for example, values of between 0.5 mm and 1.5 mm.

By way of example, the diameter values commonly employed in the hoses according to the present invention are between ¾" and 1" for the external tube 1 and between ¼" and ⅜" for the internal tube 3. The pressure levels experienced in the tubes 1, 3 can, for example, range from 0.1 MPa to 1.5 MPa. These parameters can nevertheless differ from the examples, if deemed appropriate based on the circumstances.

The hose can be completed with terminal and union elements, according to necessities. For example, the FIGURE shows an example of a possible embodiment of a union element at the end of a hose. The internal tube 3 is fitted onto a sealing end 9 of a pipeline 8 for the infeed or outfeed of the first fluid. The end 9 is appropriately shaped so as to allow the internal tube 3 to be fitted in such a way as to form a seal and can be, for example, endowed with suitable tapering and projections or transverse channeling to prevent the removal thereof. An internal pressed bushing or other suitable means can secure the first tube in a tightly sealed manner on the pipeline 8.

An external element 11 houses the pipeline 9, in a through-hole at one end, and is suitably fixed thereto (tightly sealed) in any known manner (for example, welded—as shown in the FIGURE) forming the seal between the annular space 7 and the outside. A recess 12, which is, for example, cylindrical, houses the end 9 of the pipeline 8 and also optionally (as shown in the example in the FIGURE) the end of the internal tube 3 with the bushing therefor. A sealing portion 13 that is made in an appropriately manner (for example, in a similar way to the end 9 of the pipeline), allows the external tube 1 and the second braiding 2 to be fitted, tightly sealed. Also, in this case, the sealed fixing of the external tube 1 and the second braiding 2 can be achieved with a second press-in bushing 14. The cavity 12, which has a suitable width, is connected to the inside of the annular space 7 for the passage of the first fluid. An opening 15 allows the first fluid to be fed into or out of the annular space 7. The opening 15 and the pipeline can be connected in a known manner to the first and second fluid lines, respectively, and can feature threads for the connection or other appropriate devices. It is clear that the union elements, like any other elements (such as unions for infeeding or intermediate drainage), can be made according to the knowledge of a person skilled in the art in any other manner deemed appropriate.

The invention claimed is:

1. A coaxial hose configured for an electrostatic oiling system, the hose comprising:
   a flexible external tube forming a first conduit extending therethrough; and
   a flexible internal tube disposed within and extending about the first conduit, a region of the first conduit devoid of the flexible internal tube defining an annular space configured to circulate a first fluid therethrough, the flexible internal tube including an internal layer made of PTFE and configured to circulate a second fluid within a second conduit formed by the internal layer, internal braiding comprised of knitted metal wires that is adaptable to provide pressure resistance to the internal tube, and an external layer that is made of polyamide to prevent passage of the first fluid through the braiding, wherein the braiding is disposed between the internal layer and the external layer of the flexible internal tube.

2. The hose of claim 1, wherein the flexible external tube is a corrugated tube so as to increase flexibility thereof.

3. The hose of claim 1, wherein the flexible external tube is made of PTFE.

4. The hose of claim 1, wherein the braiding of the external tube externally covers the external tube.

5. The hose according to claim 1, wherein the knitted metal wire is stainless steel.

6. An electrostatic oiling system, comprising:
   a hose comprising a flexible external tube forming a first conduit therethrough and a flexible internal tube disposed within and extending along the first conduit, a region of the first conduit devoid of the flexible internal tube forming an annular space configured to circulate a first fluid therethrough, the internal tube including an internal layer that is made of PTFE and that is configured to circulate a second fluid within a second conduit formed by the internal layer, internal braiding comprised of knitted metal wires to provide pressure resistance to the internal tube and an external layer, wherein the braiding is disposed between the internal layer and the external layer of the flexible internal tube, wherein the external layer is made of polyamide to prevent passage of the first fluid therethrough such that the first fluid does not contact the braiding, and
   wherein the external tube and the internal tube of the hose allow circulation of a heat transfer fluid and a lubricant.

7. The electrostatic oiling system according to claim 6, wherein the heat transfer fluid is the first fluid that circulates in the annular space and the lubricant is the second fluid that circulates in the internal tube.

8. The hose according to claim 6, wherein the knitted metal wires are stainless steel.

9. The electrostatic oiling system of claim 6, wherein the flexible external tube and the flexible internal tube are configured to allow for circulation of a fluid in a range between 90° C. and 120° C.

10. The electrostatic oiling system of claim 6, wherein the lubricant has a dropping point above 30° C.

11. The electrostatic oiling system of claim 6, wherein the lubricant has a dropping point between 30° C. and 50° C.

12. An electrostatic oiling system equipped with at least one hose, the electrostatic oiling system comprising:
   an external tube, which is flexible, forms a first conduit therethrough; and
   an internal tube, which is flexible, wherein the internal tube is disposed within the first conduit and extends along the first conduit, a region of the first conduit devoid of the internal tube forming an annular space configured to circulate a first fluid therethrough, wherein the internal tube includes an internal layer made of PTFE and configured to contain a second fluid, internal braiding comprised of knitted metal wires to provide pressure resistance to the internal tube and an external layer made of polyamide to prevent passage of the first fluid through the braiding,
   wherein the braiding is disposed between the internal layer and the external layer of the internal tube, and
   wherein the internal tube prevents the first and second fluids from coming into contact with one another.

* * * * *